United States Patent
Hoteit et al.

(10) Patent No.: US 9,388,979 B2
(45) Date of Patent: Jul. 12, 2016

(54) PARTICLE SEPARATION DEVICE FOR A CHEMICAL-LOOPING COMBUSTION LOOP

(75) Inventors: Ali Hoteit, Paris (FR); Florent Guillou, Ternay (FR); Sébastien Rifflart, Paris (FR); Thierry Gauthier, Brignais (FR)

(73) Assignees: TOTAL SA, Courbevoie (FR); IFP ENERGIES NOUVELLES, Rueil-Malmaison (FR)

( * ) Notice: Subject to any disclaimer, the term of this patent is extended or adjusted under 35 U.S.C. 154(b) by 337 days.

(21) Appl. No.: 13/701,587

(22) PCT Filed: May 27, 2011

(86) PCT No.: PCT/FR2011/000317
§ 371 (c)(1),
(2), (4) Date: Feb. 1, 2013

(87) PCT Pub. No.: WO2011/151537
PCT Pub. Date: Dec. 8, 2011

(65) Prior Publication Data
US 2013/0118957 A1 May 16, 2013

(30) Foreign Application Priority Data
Jun. 2, 2010 (FR) .................................. 10 02326

(51) Int. Cl.
*B07B 4/00* (2006.01)
*F23C 10/10* (2006.01)
(Continued)

(52) U.S. Cl.
CPC .............. *F23C 10/10* (2013.01); *F23C 10/005* (2013.01); *F23C 99/00* (2013.01); *F23C 2900/99008* (2013.01); *F23J 2217/60* (2013.01); *Y02E 20/346* (2013.01)

(58) Field of Classification Search
CPC ............ B07B 4/02; B07B 7/08; B07B 11/04; B01J 8/1809; B01J 8/26; B01J 2208/00672; F23C 10/10; F23C 10/26
USPC .......................... 209/138, 142; 110/245, 345
See application file for complete search history.

(56) References Cited

U.S. PATENT DOCUMENTS 4,076,796 A 2/1978 Reh et al.
4,829,912 A 5/1989 Alliston et al.
(Continued)

FOREIGN PATENT DOCUMENTS

EP 0 606 716 A 7/1994
FR 2 556 983 6/1985
(Continued)

OTHER PUBLICATIONS

Japanese Office Action in corresponding Japanese Patent Application No. 2013-512961.

*Primary Examiner* — Joseph C Rodriguez
*Assistant Examiner* — Kalyanavenkateshware Kumar
(74) *Attorney, Agent, or Firm* — Fitch, Even, Tabin & Flannery, LLP

(57) ABSTRACT

The object of the invention is a chemical-looping combustion device utilizing a solid fuel generating unburnt particles and using oxygen-carrying particles such as metallic oxides, and comprising at least one combustion zone and a separator for the particles contained in a gaseous mixture coming from the combustion zone, wherein the separator comprises at least one enclosure (1) with an intake line (4) for said mixture, a discharge line (5) arranged in the lower part of the enclosure and an outlet line (6) arranged in the upper part of the device, the intake and discharge/outlet parameters being so selected as to create in the enclosure a dense phase in the lower part and a dilute phase in the upper part, and wherein said intake line opens into the dilute phase.
The invention also relates to a combustion method implementing the device according to the invention.

14 Claims, 5 Drawing Sheets

Figure 1:
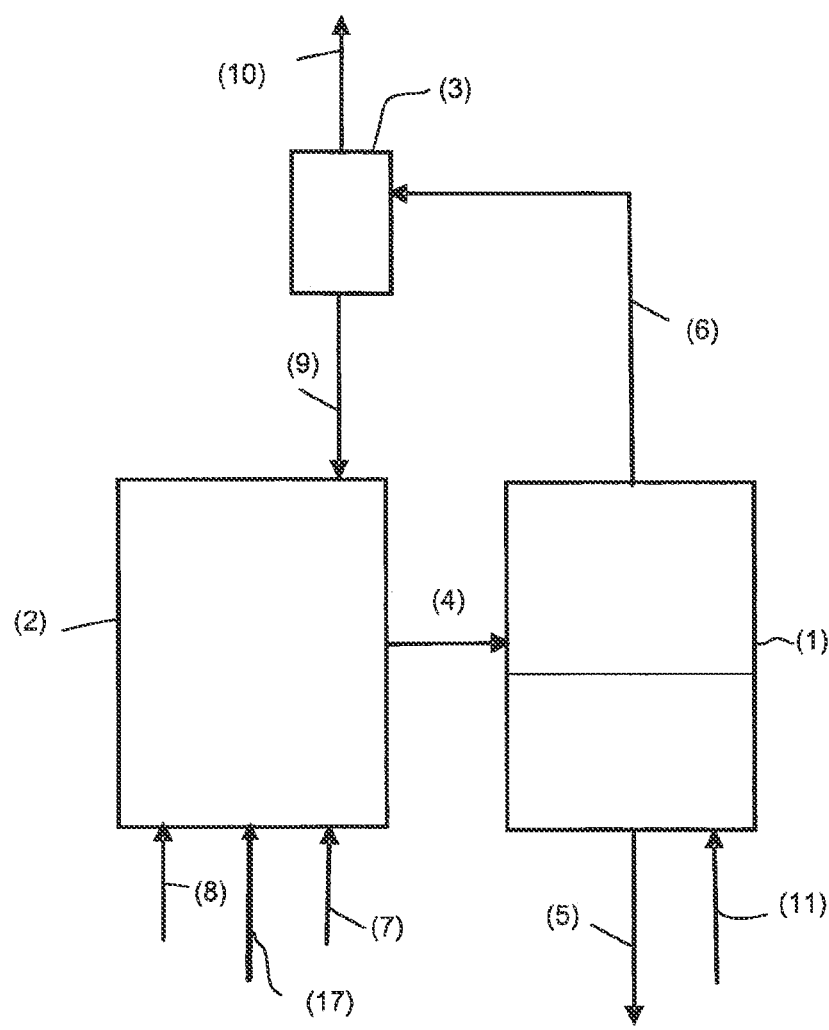

(51) Int. Cl.
*F23C 10/00* (2006.01)
*F23C 99/00* (2006.01)

(56) References Cited

U.S. PATENT DOCUMENTS

| | | | |
|---|---|---|---|
| 5,078,100 A | | 1/1992 | Huschauer et al. |
| 5,346,631 A | * | 9/1994 | Terry ........................... 210/789 |
| 7,533,620 B2 | * | 5/2009 | Morin et al. ................... 110/233 |
| 2005/0175533 A1 | * | 8/2005 | Thomas et al. ............... 423/657 |
| 2009/0072538 A1 | | 3/2009 | Morin et al. |
| 2010/0104482 A1 | | 4/2010 | Morin et al. |
| 2013/0143167 A1 | * | 6/2013 | Proell et al. ...................... 431/7 |

FOREIGN PATENT DOCUMENTS

| | | |
|---|---|---|
| FR | 2 850 156 | 7/2004 |
| FR | 2 896 709 A1 | 8/2007 |
| GB | 2 052 032 A | 1/1981 |
| JP | 64-79504 | 3/1989 |
| JP | 4100616 | 8/1992 |
| JP | 2009-521588 | 6/2009 |
| JP | 2009529651 | 8/2009 |

\* cited by examiner

PARTICLE SEPARATION DEVICE FOR A CHEMICAL-LOOPING COMBUSTION LOOP

FIELD OF THE INVENTION

The invention relates to the sphere of particle separation, and more particularly to the separation of metallic oxide particles, on the one hand, and of unburnt particles possibly associated with fly ashes, on the other hand, within the context of chemical looping combustion for the production of energy, syngas and/or hydrogen.

BACKGROUND OF THE INVENTION

Chemical looping combustion (CLC) consists in contacting in an enclosure at high temperature a gaseous, liquid and/or solid hydrocarbon feedstock with an oxygen-carrying metallic oxide type solid. The metallic oxide yields part of the oxygen it contains, which takes part in the combustion of the hydrocarbons.

After combustion, the fumes predominantly contain carbon oxides, water and possibly hydrogen. In fact, it is not necessary to contact the hydrocarbon feedstock with air and the fumes are then predominantly made up of combustion gases and possibly of a dilution gas used for transport and fluidization of the particles or a gas (water vapour for example) promoting solid fuel gasification.

It is thus possible to produce, after condensation, predominantly nitrogen-free fumes with high $CO_2$ contents (generally above 90 vol. %, or even 98 vol. %) allowing to consider $CO_2$ capture and storage. The metallic oxide that has taken part in the combustion is then carried to another reaction enclosure where it is contacted with air in order to be re-oxidized.

Implementing a chemical-looping combustion method requires large amounts of metallic oxides in order to burn all of the fuel. These metallic oxides are generally contained either in ore particles or in particles resulting from industrial treatments (residues from the iron and steel industry or from the mining industry, used catalysts from the chemical industry or refining). It is also possible to use synthetic materials such as, for example, alumina or silica-alumina supports on which metals that can be oxidized (nickel for example) have been deposited. The maximum oxygen capacity really available varies considerably from one oxide to another, generally ranging between 0.1 and 15%, often between 0.3 and 6 wt. %. Implementation under fluidized bed conditions is therefore particularly advantageous for conducting the combustion. Indeed, the finely divided oxide particles circulate more readily in the combustion and oxidation reaction enclosures, and between these enclosures, if the properties of a fluid are conferred on the particles.

Patent application FR-2,850,156 describes a chemical-looping combustion method wherein the fuel is crushed prior to being fed into the reduction reactor operating under circulating fluidized bed conditions. The reduced size of the solid fuel particles allows more complete and faster combustion. Separation downstream from the circulating bed is first provided by a cyclone, then by a device allowing the unburnt particles to be separated from the metallic oxide particles. Unburnt particles entrainment in the oxidation zone and therefore $CO_2$ emissions in the oxidation reactor effluents is thus prevented.

The separation device is fluidized by water vapour, which allows to separate the fine and light particles such as carbon-containing residues and to feed them into the reactor again, whereas the denser and bigger oxide particles are transferred to the oxidation reactor.

The object of patent application FR-2,896,709 is a particle separator operating in a chemical looping process. This separator is fed with the stream of oxygen-carrying particles mixed with the solid fuel. In the separator, the particles flow in the dense phase by following a tortuous path and passing through baffles, which allows to control the residence time and to promote separation of the lighter particles (unburnt particles) from the heavier particles (metallic oxides). The particles are then fed into a fluidization zone, said fluidization being controlled by means arranged at the base of the separator as well as on the deflector walls, which allows the lighter particles to be entrained and recycled to the fluidization reactor.

The operation of the separator according to document FR-2,896,709 however induces several not insignificant drawbacks.

Indeed, the separation efficiency is reduced due to a limitation of the particle entrainment capacity in the gas phase. In fact, for large amounts of particles to be carried along, large amounts of gas and free sections are required.

Furthermore, in the dense phase, it is impossible to totally separate two different solid phases. In fact, the ascending motion of the gas bubbles paradoxically causes the lighter particles to descend again towards the dense phase and prevents total separation.

Besides, the geometry of the separator of document FR-2,896,709 is very complicated due to the presence of internals, notably asymmetrical internals. This geometry is problematic considering the mechanical stresses undergone by the materials that make up the separator under the temperature conditions of the CLC process, generally above 800° C. Indeed, although the external walls are often protected by refractory cement and remain at low temperature, this is not the case for the internal walls that are subjected to the process conditions.

The applicants have developed a new separator wherein the particle mixture coming from the combustion zone is contacted with a gaseous stream coming from the combustion zone and/or from an external gas source. This mixture then enters the dilute phase of the separator. In the separator, the velocity of the gas flow is controlled so as to allow the heavier particles to settle (essentially metallic oxide particles), the lighter particles (essentially unburnt particles) being carried along to the upper part of the separator in order to be recycled to the combustion zone.

The separator according to the invention thus has improved unburnt particles and metallic oxide particles separation efficiency.

Furthermore, the relatively simple design of the separator allows the problems linked with thermal stresses to be overcome.

SUMMARY OF THE INVENTION

The present invention thus relates to a chemical-looping combustion device utilizing a solid fuel generating unburnt particles and using oxygen-carrying particles such as metallic oxides, and comprising at least one combustion zone and a separator for the particles contained in a gaseous mixture coming from said combustion zone, wherein the separator comprises an enclosure with at least one intake line for said mixture, a discharge line arranged in the lower part of the enclosure and an outlet line arranged in the upper part of the device, the intake and discharge/outlet parameters being so selected as to create in the enclosure a dense phase in the lower part and a dilute phase in the upper part, and wherein said intake line opens into the dilute phase.

The separator enclosure can also comprise a delivery line for a gas coming from an external source.

The outlet line can be connected to a gas-solid separator for discharging a gas depleted in unburnt particles through a line and for recycling the unburnt particles through a line communicating with the combustion zone.

The intake line can open into the enclosure in a substantially axial manner and by a length ranging between 1 and 5 times the diameter of the enclosure.

The intake line can open into the enclosure in the lower part thereof.

The lower part of the enclosure can comprise an annular space between the external wall of the intake line and the wall of the separator.

The combustion zone can comprise at least one solid feedstock delivery line, an oxygen-carrying particle delivery line, a fluidization gas delivery line, so as to form said gaseous mixture.

The invention also relates to a chemical-looping combustion method utilizing a solid fuel generating unburnt particles and using oxygen-carrying particles such as metallic oxides, and comprising at least one combustion zone and a separator for the particles contained in a gaseous mixture coming from the combustion zone, a method comprising allowing a mixture of particles and of gas into the separator enclosure, extracting the particles through an outlet in the upper part of the enclosure and an evacuation in the lower part of this enclosure, the intake and extraction parameters being so selected as to create in the enclosure a lower dense phase and an upper dilute phase, a dilute phase into which said mixture is allowed.

The separator enclosure can be fed with a gas coming from an external source.

The superficial velocity of the gas in the dilute phase of the enclosure of the device can be set at a value ranging between 30 and 300% of the mean terminal settling velocity of the oxygen-carrying particles.

The superficial velocity of the gas in the dilute phase of the enclosure of the device can be set at a value ranging between 75 and 125% of the mean terminal settling velocity of the oxygen-carrying particles.

The velocity of the gas in the upper part of the combustion zone can range between 3 and 10 m/s.

The separator can be arranged above the combustion zone.

The enclosure can be supplied with a gas coming from an external source representing less than 20% of the total gas flow in the separator.

The combustion zone can operate in dense-phase fluidized bed mode, the particles thereof being transported to the separator, transport being controlled by an L-type valve.

The combustion zone can operate in dense-phase fluidized bed mode, the particles thereof being transported to the separator through a gas/solid separator at the outlet of which the particles flow into the separator.

DETAILED DESCRIPTION

Figure 3:
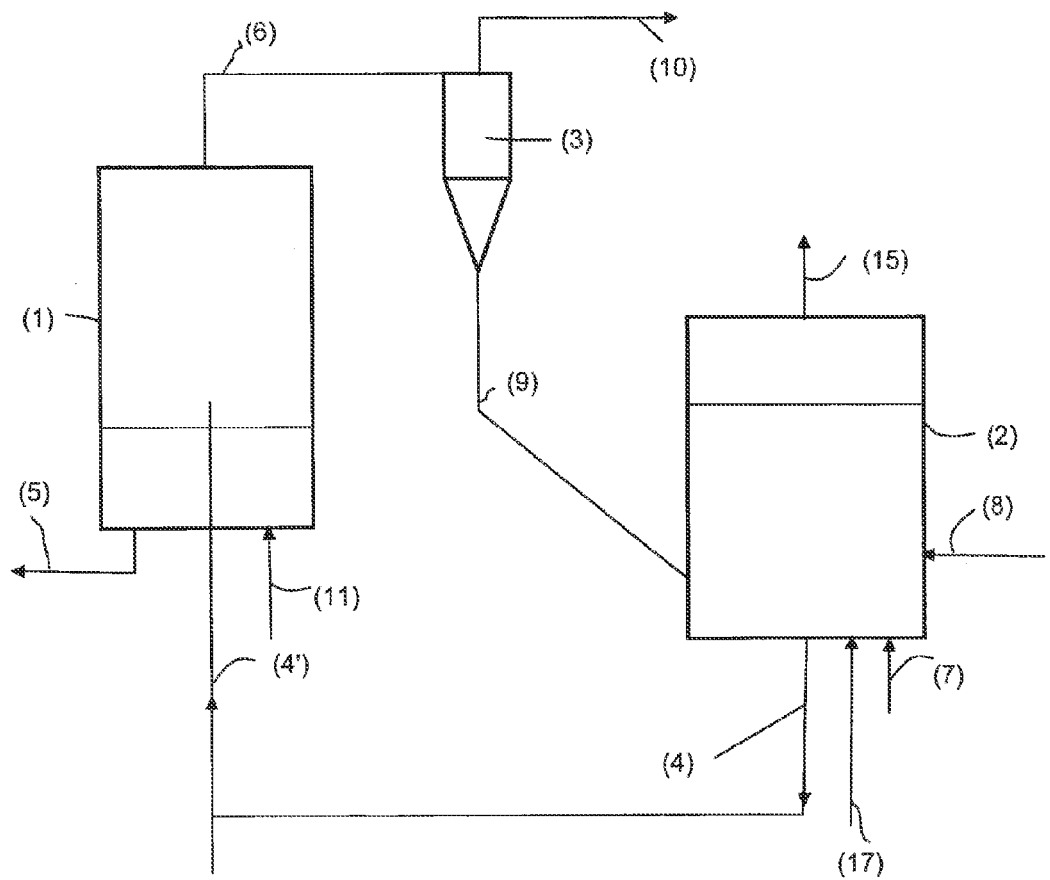
Figure 4:
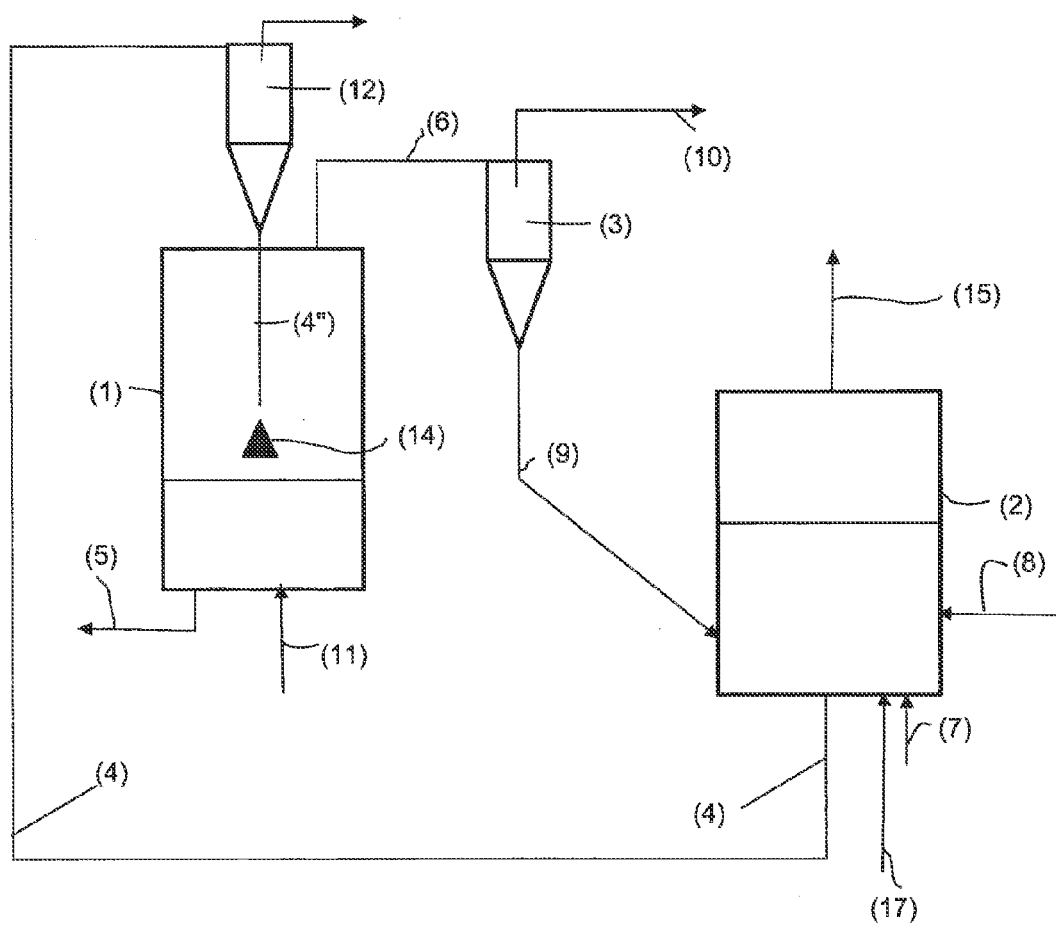
Figure 5:
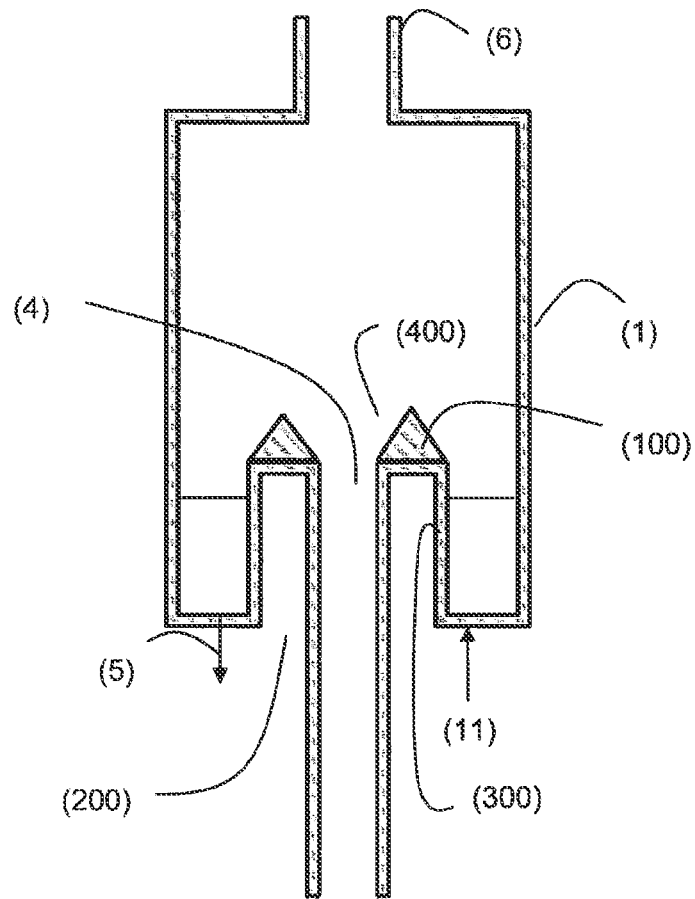

The invention is illustrated by FIGS. 1 to 5 that show, only by way of non-limitative example, various implementations and integrations of the device according to the invention at the outlet of a combustion zone of a CLC plant. FIG. 5 illustrates a particular geometry of the device according to the invention.

FIG. 1 describes the invention integrated in a global scheme.

Zone (2) represents the combustion zone of a chemical-looping combustion (CLC) process fed with a solid feedstock through a line (7), oxygen-carrying particles through a line (8) coming from the oxidation zone (not shown) of the CLC process and a fluidization gas delivered through a line (17) such as, for example, water vapour or $CO_2$ for promoting fluidization of the oxide particles.

The solid feedstock (or fuel) treated in the combustion zone generally consists of a solid hydrocarbon source predominantly containing carbon and hydrogen. The feedstock is advantageously selected from among coal, coke, pet-coke, biomass, bituminous sands and household waste.

This combustion zone (2) can operate in dense-phase fluidized bed or circulating fluidized bed mode, or with a layout of beds consisting of a dense phase and of a transport phase.

Advantageously, the gas velocity in the upper part of the combustion zone ranges between 3 and 10 m/s.

A particle stream containing metallic oxide particles, referred to as heavy particles, and light particles comprising unburnt particles and possibly fly ashes, all of them in a gaseous stream, is extracted from zone (2) prior to being fed into a separator (1) through an intake line (4).

All or part of the gaseous stream comes from combustion zone (2) and it predominantly consists of CO, $CO_2$, $H_2$ and $H_2O$, and the complement can come from an external source containing, for example, recycled $CO_2$ and/or water vapour, fed into line (11) in the lower part of separator (1).

Preferably, all the gaseous combustion effluents are used for the separation and, more preferably, at least 80% of the combustion zone effluents are used.

Separation between the heavy particles and the light particles takes place in this separator (1), the heavy particles settling in the lower part of the separator prior to being extracted through a discharge line (5), and the light particles being carried along to the upper part prior to being extracted through an outlet line (6), then fed into a gas-solid separator (3), a cyclone for example.

The purpose of this cyclone is to separate the gas depleted in unburnt particles that is afterwards extracted through a line (10) and the unburnt particles carried along with the metallic oxide particles extracted through a line (9) and recycled to combustion zone (2).

The heavy particles extracted in the lower part of the separator predominantly consist of metallic oxides and they can be sent to a second combustion zone where the oxygen carrier will be reduced further, or to an oxidation zone allowing the oxygen carrier to recover at least part of the degree of oxidation it had at the inlet of combustion zone (2), and the lighter unburnt particles are recycled to the combustion zone after separation from the gaseous effluent.

Thus, the intake and discharge/outlet parameters are so selected as to create in the enclosure a dense phase in the lower part and a dilute phase in the upper part, and intake line (4) opens into the dilute phase.

The particles that settle in the lower part form a dense phase consisting of the heavier particles, of more or less great height in the separator depending, among other things, on the density of the particles, and on the supply and extraction flow rates, but the level of said dense phase forming the interface with the dilute phase is in any case below intake (4) opening into the separator and allowing delivery of the mixture of particles extracted from the combustion zone.

Thus, by feeding the mixture of particles extracted from the combustion zone diluted in a gaseous stream—the volume fraction of particles in the gaseous stream being generally below 5%, preferably between 1 and 2%—into the dilute phase of the separator according to the invention, it is possible to obtain fast separation with the best possible separation efficiency, on the one hand, of the oxygen-carrying particles that settle in the lower part, or dense phase, of said separator, and on the other hand of the unburnt particles, and possibly fly ashes and gas, which are carried along in the upper part, or dilute phase, of said separator, while having a good separation efficiency.

What is referred to as fast separation is a separation performed within less than 1 minute and preferably less than 20 seconds, this time corresponding to the residence time of the light particles in the dilute phase of the separator.

Parameters are understood to be all the conditions allowing to control the circulation of the fluid and/or of the solids concerned, such as velocity, flow rate, mass, etc.

The dilute phase generally has a solids content below 5% or even below 1% by volume.

The separation efficiency can then be defined by the formula as follows:

X=amount of unburnt particles carried along with the gas/total amount of unburnt particles in the mixture of particles entering the separator.

A separation efficiency generally above 70%, or even above 80% can be obtained with the invention.

This good separation efficiency allows to optimize the $CO_2$ capture rate at a value above 90%, the latter being defined by the ratio of the amount of $CO_2$ emitted in the combustion zone to the total amount of $CO_2$ emitted in the CLC loop.

Furthermore, the superficial velocity of the flow in the separation zone has to be higher than the terminal settling velocity of the unburnt fuel particles so as to enable entrainment thereof with the gas.

The superficial gas velocity in the dilute phase of the separation zone is set at a value generally ranging between 30 and 300% of the mean terminal settling velocity of the oxygen-carrying particles, preferably ranging between 75 and 125%. In this velocity range, the flow of particles entrained in the dilute phase of the separator remains below 5 kg/s/m$^2$, and preferably below 1 kg/s/m$^2$.

The mean terminal settling velocity is obtained from the formula as follows (*):

$$V_t = \left(\frac{4 d_p (\rho_s - \rho_g) g}{3 \rho_g C_D}\right)^{1/2}$$

where: $d_p$ is the mean particle diameter
$\rho_s$ is the particle density (kg/m$^3$)
$\rho_g$ is the gas density (kg/m$^3$)
$C_D$ the drag coefficient
(*) in: Fluidization Engineering, Butterworth-Heinemann, Daizo Kunii, Octave Levenspiel, p. 80.

The geometry of the separator can be parallelepipedic, cylindrical or it can have any other three-dimensional geometry, with preferably a symmetry of revolution.

In general, the material used for the enclosure of the separator can be selected from among special steels such as hastelloy or ceramics.

In order to limit manufacturing costs, it is also possible to consider, for the external parts of the separator, standard steels on which armoured refractory cement layers are deposited (with thicknesses generally ranging between 2 and 50 cm, generally close to 20 cm) on the internal faces exposed to the flow and to high temperatures.

When the geometry of the separator has a symmetry of revolution, line (4) opens into the enclosure with an axial depth preferably ranging between 1 and 5 times the diameter of the enclosure, preferably between 1 and 2 times the diameter of the enclosure.

Furthermore, when the enclosure has a symmetry of revolution, the height of the enclosure available above the point where intake line (4) opens into the enclosure generally ranges between 1.5 and 10 times the diameter of the enclosure.

The particles of metallic oxides such as, for example, Fe, Ti, Ni, Cu, Mn, Co, V oxides are used alone or in admixture, and their mean size is generally above 50 microns, preferably ranging between 100 and 500 microns.

The density of the metallic oxides, synthetic or mineral, supported or not, is generally above 1500 kg/m$^3$. For example, the nickel oxide particles supported on alumina (NiO/NiAl$_2$O$_4$) generally have a grain density ranging between 2500 and 3500 kg/m$^3$ depending on the porosity of the support and on the proportion of nickel oxide, typically around 3200 kg/m$^3$.

Ilmenite, an ore comprising titanium and iron, has a density of 4700 kg/m$^3$.

The separation device according to the invention is advantageously used for separating unburnt particles from metallic oxide particles of density above 2500 kg/m$^3$, preferably above 4000 kg/m$^3$.

The size and the density of the oxygen-carrying particles are generally much greater than those of the fly ashes and of the unburnt particles that have already been in contact with the oxygen-carrying particles in the combustion zone at high temperature. At the combustion zone outlet, the size of the unburnt coal particles is estimated to be below 100 microns and the size of the major part of the particles is estimated to be below 50 microns. The density of these particles generally ranges between 1000 and 1500 kg/m$^3$.

Other particles such as the fly ashes resulting from the combustion of the solid feedstock can also circulate with the rest of the particles and they are characterized by a lower particle size and density than the oxygen-carrying particles, and also often lower than the unburnt particles.

Figure 2:
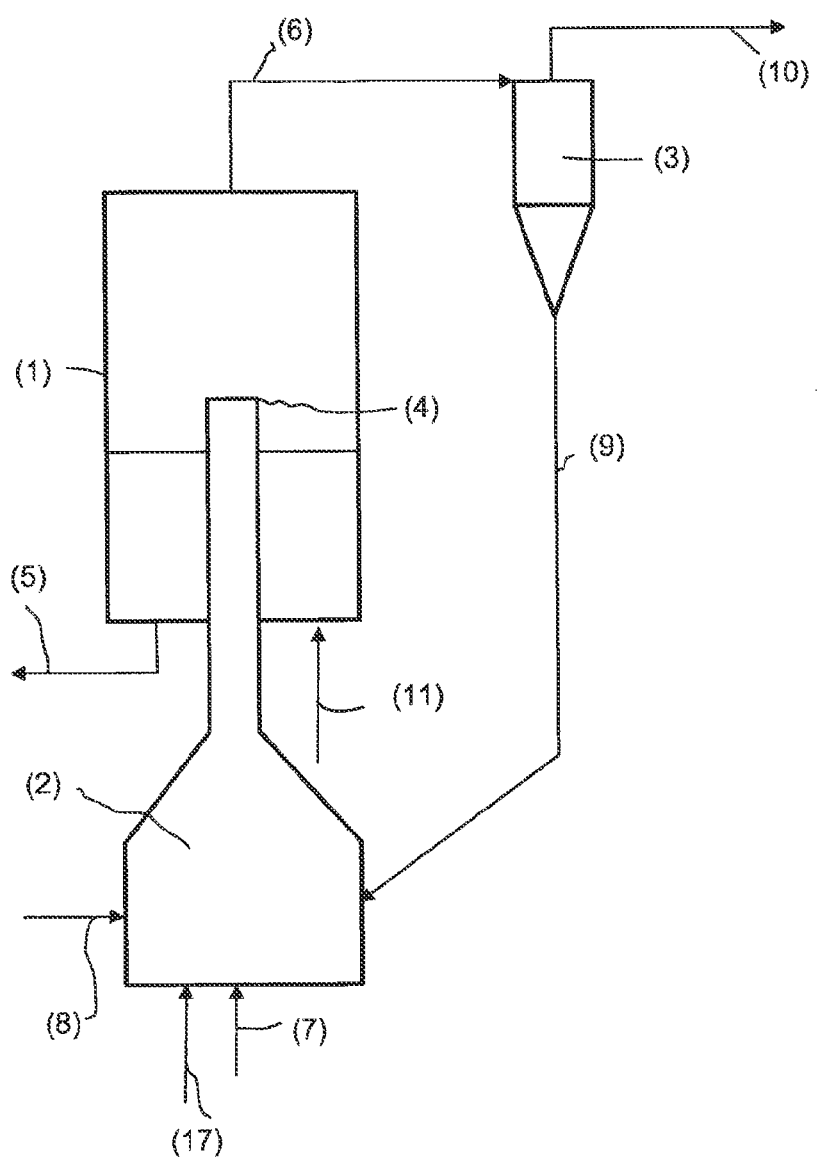

FIG. 2 differs from FIG. 1 in that intake line (4) opens axially directly into separator (1) arranged above combustion zone (2).

According to this embodiment, the upper part of the combustion zone is narrower, which allows to accelerate and to transport the gas-particle mixture leaving the combustion zone and comprising combustion fumes, unburnt particles and possibly fly ashes.

The velocity of the gas in the upper part of the combustion zone preferably ranges between 3 and 10 m/s, and the flow of particles transported in this part ranges between 25 and 500 kg/s/m$^2$, preferably between 60 and 300 kg/s/m$^2$.

Line (4) opens into the separator in a dilute phase essentially consisting of gas (at least 95 vol. %). Due to the imposed gas velocity in separator (1), the heavy particles settle in the lower part of the separator and they are extracted through line (5), while the light particles are carried along in the upper part of separator and discharged through line (6).

The flow of light particles entrained in relation to the section of separator (1) is below 5 kg/s/m$^2$, it generally ranges between 0.02 and 1.0 kg/s/m$^2$ and it contains at least 50% of the unburnt particles from combustion zone (2).

One may consider forming a fluidized dense phase in the lower part of separator (1), provided that the level of the interface between the dense phase and the dilute phase is kept below the end of line (4) opening into separator (1).

In this case, fluidization of the dense phase is conducted by adding a make-up gas external to the combustion chamber through a line (11). This gas flows through separation zone (1)

and takes advantageously part in the physical process of separation of the particles prior to leaving the separator through line (6).

The other elements of FIG. 2 are similar to those of FIG. 1 having the same reference number.

FIG. 3 differs from FIG. 2 in that combustion zone (2) where the solid feedstock delivered through line (7) is burned on contact with the oxygen-carrying particles delivered through a line (8) in a dense-phase fluidized bed, fluidization being operated by feeding a gas delivered through a line (17) and containing for example water vapour and/or carbon dioxide. The combustion fumes are discharged from combustion zone (2) through a line (15) arranged in the upper part of the fluidized bed of this zone.

According to this configuration, the particles are withdrawn in the dense phase of the fluidized bed and transported independently of the combustion fumes in lines (4) and (4') to separation zone (1). The transport means represented by lines (4) and (4') include for example a dense phase withdrawal device, a vertical tube wherein the particles flow downward, a non-mechanical valve of L-valve type allowing to control the flow of particles through controlled injection of an insufflation gas upstream from a bend in a transport lift where a gas external to combustion zone (2) is injected so as to transport the particles.

According to this embodiment, the particles thus flow into separator (1) in the presence of a gas allowing ascending transport thereof.

The gas-particle mixture from combustion zone (2) opens into separator (1) through the end of line (4') in a dilute phase essentially consisting of gas (at least 95 vol. %) wherein the superficial velocity is controlled by adding gas through line (11).

Adjustment of the superficial velocity in separator (1) allows to control the amount of particles entrained towards outlet (6). The particles that are not entrained towards this outlet (6) settle in the dense phase of separator (1), they are collected in the lower part of separator (1) and discharged through a line (5) to another reaction zone.

The other elements of FIG. 3 are similar to those of FIG. 2 having the same reference number.

FIG. 4 describes another embodiment of the invention that differs from FIG. 3 in that the particles entering separator (1) are delivered through a descending line (4") wherein the particles arrive in dense-phase descending transport mode, the motion of the particles depending on gravity and not on the surrounding gas velocity.

Prior separation of the mixture transported in intake line (4) is therefore performed, for example in a gas-solid separator (12). The solid particles then flow through line (4") into separator (1) and they are distributed over the entire section of separator (1) by means of a deflector (14) such as a "Chinese hat" type deflector for example, with a hollow cone of greater section than that of line (4").

With this new delivery mode, the gas taking part in the particle separation in separator (1) is fed quasi totally to the base of the enclosure through a line (11), the interstitial gas delivered through line (4") with the particles representing a negligible amount. The gas fed into line (11) optionally flows through a dense phase of fluidized particles, the level of this dense phase being kept below deflector (14) so that the particles entering the separator flow into the dilute phase.

FIG. 5 describes a particular geometry of the device according to the invention. It comprises, in the lower part thereof, a circular recess or annular space (200) between the wall of line (4) opening in the dilute phase and external wall (300) of the separator arranged on the smaller diameter. Thus, all the surfaces of the device comprise an external face, which can be easily cooled, and it is possible to cover all the internal faces with a refractory cement (100). Under such conditions, the external walls are no longer exposed to high temperature levels and they are protected against contact with the gas and particle streams. It is thus possible to use cheap steels for the device, which is of great advantage for large-size devices (when the inside diameter of line (4) exceeds 15 cm). Furthermore, by adapting the shape of the deposited refractory material layer to the outlet of line (4), a divergent cone (400) allowing the velocity profile to be homogenized over the entire section of the device can be generated.

Example

According to the Invention

The implementation of the invention is illustrated by the embodiment associated with FIG. 2.

The tests intended to quantify the performance of the device according to the invention were carried out on a cold model simulating the flows.

The model comprises a 2-cm inside diameter transport tube in which the particles are transported by air under ambient conditions, the air simulating the combustion fumes.

The transport tube opens into the dilute phase of a cylindrical separation enclosure of constant section (inside diameter 12.5 cm). The tube penetrates the enclosure over a depth of 20 cm, which leaves a height of 80 cm above the outlet of the line in the dilute phase to carry out separation. The separation enclosure is equipped, at the base thereof, with a gas distribution box allowing fluidization of the particles around the transport line. The level of the fluidized dense phase is kept below the outlet of the transport line opening into the separation enclosure.

The superficial gas velocity in the dilute phase above the transport tube outlet is denoted by Vsg.

The gas velocity in the transport tube is 3 m/s.

The flow rate of the solids circulating in the transport tube and fed into the separation zone is 140 kg/h, which corresponds to a flow of 123 kg/s/m$^2$.

The light particles mass concentration in the entire flow of particles entering the separator is denoted by Cl.

The separation between particles was simulated under ambient conditions using two types of particles:

oxygen-carrying particles consisting of a heavy iron and titanium ore (ilmenite) with the following properties:
mean particle diameter, Sauter diameter: 112 microns
particles density: 4740 kg/m$^3$
mean terminal settling velocity under the process conditions: 1.07 m/s FCC catalyst particles, smaller and less dense, simulating the unburnt coke or coal particles under the process conditions, with the following properties:
mean particle diameter, Sauter diameter: 52 microns
particles density: 1450 kg/m$^3$
mean terminal settling velocity under the process conditions: 0.12 m/s.

The table below shows the separation efficiencies (E %) for the light FCC particles corresponding to the fraction of these particles entrained in the gas outlet of the separator in relation to the amount of particles entering the separator.

| Vsg (m/s) | 1.00 | 1.10 | 1.10 | 1.10 |
|---|---|---|---|---|
| Cl (%) | 1.0 | 1.0 | 2.0 | 2.0 |
| E (%) | 73.6 | 88.5 | 78.2 | 89.9 |

It can be observed that if the superficial velocity in the dilute phase is close to the terminal settling velocity of the heavier particles (1.07 m/s on average), the separation efficiency is high. Thus, when the gas velocity in the dilute phase is 1.0 or 1.1 m/s, the light particle recovery efficiency can be above 70%.

The invention claimed is:

1. A chemical-looping combustion device utilizing a solid fuel generating unburnt particles and using oxygen-carrying particles such as metallic oxides, and comprising at least one combustion zone, a separator for the particles contained in a gaseous mixture coming from said at least one combustion zone, and a gas-solid separator wherein:
the separator is arranged above the at least one combustion zone and comprises an enclosure having an upper part, a lower part, at least one intake line for said gaseous mixture coming from the at least one combustion zone, a discharge line arranged in the lower part of the enclosure and an outlet line arranged in the upper part of the enclosure, the intake and discharge/outlet parameters being so selected as to create in the enclosure a dense phase in the lower part and a dilute phase in the upper part, and wherein the at least one intake line opens into the dilute phase,
the gas-solid separator is fed through said outlet line and comprises a line capable of discharging a gas depleted in light unburnt particles and a line communicating with the at least one combustion zone capable of recycling the unburnt particles to the at least one combustion zone,
wherein the dense phase in the lower part of the enclosure of the separator created by the intake and discharge/outlet parameters of the separator comprises metallic oxides, and
wherein the dilute phase in the upper part of the separator created by the intake and discharge/outlet parameters of the separator comprises unburnt particles.

2. A device as claimed in claim 1, wherein the enclosure of the particle separator also comprises a delivery line cable of feeding a gas coming from an external source.

3. A device as claimed in claim 1, wherein said intake line opens into the enclosure of the separator in a substantially axial manner and by a length ranging between 1 and 5 times the diameter of the enclosure.

4. A device as claimed in claim 1, wherein the intake line opens into the enclosure of the separator in the lower part thereof.

5. A device as claimed in claim 1, wherein the lower part of the enclosure of the separator comprises an annular space between an external wall of the intake line and a wall of the separator.

6. A device as claimed in claim 1, wherein the at least one combustion zone comprises at least one solid feedstock delivery line, an oxygen-carrying particle delivery line, a fluidization gas delivery line, capable of collectively forming said gaseous mixture.

7. A chemical-looping combustion method utilizing a solid fuel generating light particles comprising unburnt particles, utilizing heavy oxygen-carrying particles comprising metallic oxides, and utilizing a chemical-looping combustion device comprising at least one combustion zone, a particle separator comprising an enclosure, and a gas-solid separator, the method comprising:
allowing a gaseous mixture coming from said at least one combustion zone, into the enclosure of the particle separator, the gaseous mixture comprising combustion gases, said light particles comprising unburnt particles and said heavy oxygen-carrying particles comprising metallic oxides,
extracting the light particles through an outlet in the upper part of said enclosure and discharging the heavy oxygen-carrying particles through an outlet in the lower part of said enclosure, wherein intake and extraction parameters of the particle separator create in the enclosure a lower dense phase comprising the heavy oxygen-carrying particles comprising metallic oxides and an upper dilute phase comprising the light particles comprising unburnt particles,
sending a mixture predominantly consisting of the light unburnt particles extracted through the outlet in the upper part of the enclosure to the gas-solid separator,
discharging from the gas-solid separator a gas depleted in unburnt particles through a line,
recycling the unburnt particles to the at least one combustion zone through a communication line.

8. A method as claimed in claim 7, wherein the enclosure of the particle separator is fed with a gas coming from an external source.

9. A method as claimed in claim 7, wherein the dilute phase within the enclosure of the particle separator comprises a gas having a superficial velocity set at a value ranging between 30 and 300% of the mean terminal settling velocity of the oxygen-carrying particles.

10. A method as claimed in claim 9, wherein the superficial velocity of the gas in the dilute phase of the enclosure of the particle separator is set at a value ranging between 75 and 125% of the mean terminal settling velocity of the oxygen-carrying particles.

11. A method as claimed in claim 7, wherein the at least one combustion zone comprises an upper part having a gas, a velocity of the gas in the upper part of the at least one combustion zone ranges between 3 and 10 m/s.

12. A method as claimed in claim 7, wherein the enclosure of the particle separator is fed with a gas coming from an external source representing less than 20% of the total gas flow in the separator.

13. A method as claimed in claim 7, wherein the at least one combustion zone operates in a dense-phase fluidized bed mode, the particles within the gaseous stream coming from the at least one combustion zone being transported to the particle separator, transport being controlled by an L-type valve.

14. A method as claimed in claim 7, wherein the at least one combustion zone operates in a dense-phase fluidized bed mode, the particles within the gaseous stream coming from the at least one combustion zone being transported to the particle separator through a gas/solid separator comprising an outlet through which the particles flow into the particle separator.

* * * * *